June 16, 1936.  H. W. ALDEN ET AL  2,044,196
AUTOMOTIVE VEHICLE
Original Filed Oct. 19, 1932  2 Sheets-Sheet 1
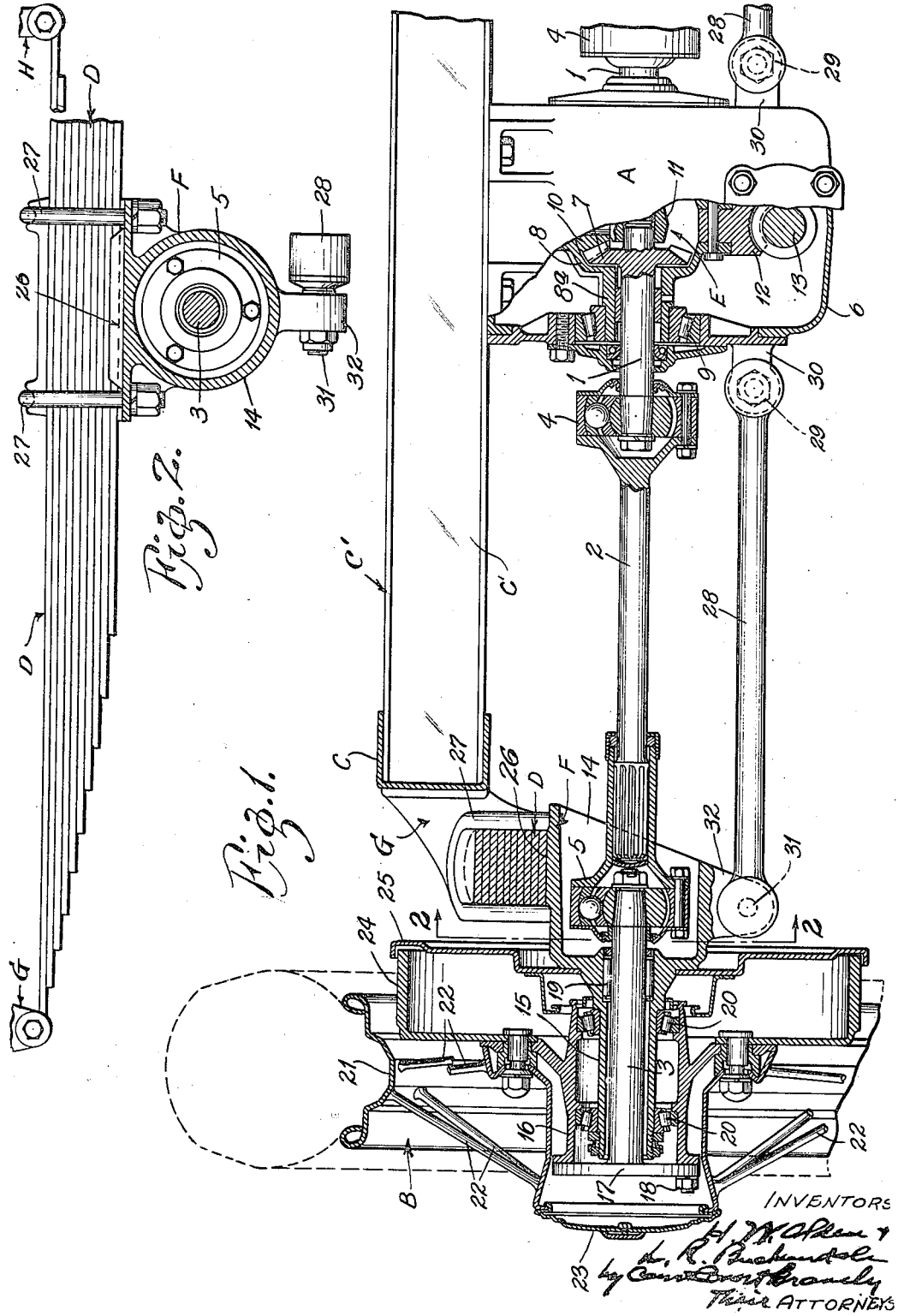

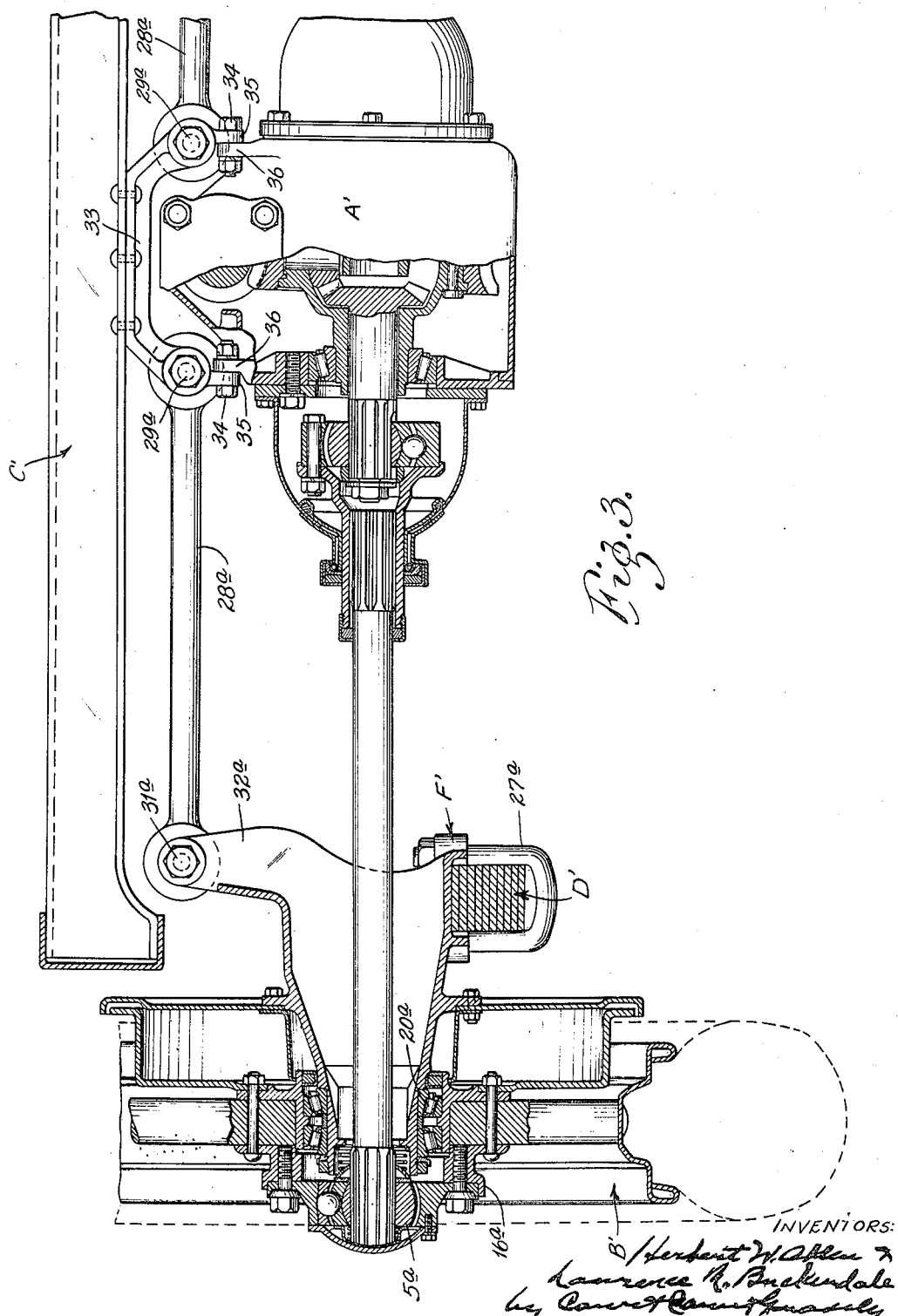

Patented June 16, 1936

2,044,196

UNITED STATES PATENT OFFICE 2,044,196

AUTOMOTIVE VEHICLE

Herbert W. Alden and Laurence Raymond Buckendale, Detroit, Mich., assignors to The Timken-Detroit Axle Company, Detroit, Mich., a corporation of Ohio Application October 19, 1932, Serial No. 638,564
Renewed April 27, 1936

10 Claims. (Cl. 180—73)

This invention relates to automotive vehicles of the kind having differential driving axles comprising a differential gear unit which is mounted on the body or frame of the vehicle and has articulate axle shaft connections with the road wheels. Its principal objects are to simplify the construction of the driving axle, reduce the weight thereof, dispense with parts heretofore needed, provide independently movable wheels, provide for stabilizing said wheels, permit the use of longitudinal side springs, decrease the cost of manufacture and facilitate repair. The invention consists in the automotive driving axle construction and in the arrangements and combinations of parts hereinafter described and claimed.

In the accompanying drawings, which form part of this specification and wherein like symbols refer to like parts wherever they occur, Fig. 1 is a vertical transverse section taken through an automotive vehicle provided with a differential driving axle embodying our invention, the axle being shown in longitudinal section;

Fig. 2 is a vertical cross-section on the line 2—2 in Fig. 1; and

Fig. 3 is a view similar to Fig. 1, showing a modified form of differential driving axle.

The motor vehicle construction indicated in Figs. 1 and 2 of the present drawings comprises an articulated differential driving axle A having a driving connection at each end with a road wheel B, from which the body of the vehicle is operatively sustained by a semi-elliptic spring D that is located above the axle and extends longitudinally of the vehicle adjacent to said wheel. The drawings illustrate a separate body supporting frame including a side rail C and a cross-rail C'; but such frame may be dispensed with in constructions wherein the body constitutes the frame. Springs D are connected at their front ends to frame C by means of spring brackets G in well known manner, and the rear ends thereof are connected to frame C by means of conventional link or "kick-shackle" assemblies H. The drawings show only one end of the driving axle, but it will be understood that the construction of the other end is like that shown.

The differential driving axle comprises a differential gear unit E, which is suspended from the transverse member C' of the body frame between the road wheels B. The road wheels B are driven from the differential unit E through an articulated axle shaft comprising axially alined inner, intermediate and outer sections 1, 2 and 3, respectively, extending from each side of said unit to the wheel on that side. The adjacent ends of the inner and intermediate axle shaft sections 1 and 2, respectively, are operatively connected by a suitable universal joint construction 4; and likewise, the adjacent ends of the intermediate and end axle shaft sections 2 and 3, respectively, are operatively connected by a suitable universal joint construction 5, which also permits limited relative axial movement of said end and intermediate axle shaft sections.

The differential gear unit E comprises a main housing 6, within which is enclosed a suitable differential gear mechanism including two opposed bevel side gears 7 formed integral with the adjacent ends of the inner axle shaft sections 1 that are journaled in the extended hubs 8a of a differential casing 8. The hubs 8a are journaled in suitable antifriction bearings 9 seated in the end walls of the main housing 6 of the differential gear unit. Between the side gears 7 are a series of bevel pinions 10, each rotatably mounted on the arm of a spider 11, which is mounted in the differential casing 8 concentric with said side gears. Fixed to the differential casing 8 concentric with the inner axle shaft is a worm gear ring 12 that is driven by a worm 13 journaled in the main housing 6 of the differential gear unit.

A bracket F has a hollow cylindrical main body portion 14, which loosely surrounds the adjacent ends of the intermediate and outer axle shaft sections 2 and 3 and the universal joint connection 5 therebetween, and an outwardly extending tubular spindle portion 15, through which said outer axle shaft section extends and on which the hub portion 16 of the road wheel B revolves. The outer axle shaft section 3 is provided at its outer end with a driving disk 17, which is secured by means of cap screws 18 to the outer end of the tubular hub of the road wheel. A suitable antifriction bearing 19 is interposed between the bore of the tubular spindle 15 of the bracket F and the outer axle shaft section 3. Suitable antifriction bearings 20 are also interposed between said spindle and the hub 16 of the wheel journaled thereon. The hub 16 of the wheel is connected to the rim 21 thereof by means of usual spokes 22; and the usual hub cap 23 is provided for covering the wheel hub and driving disk therefor. A suitable brake drum 24 is fixed to the wheel hub and is closed by means of a brake supporting disk 25 fixed to the bracket F. The top of the bracket F is provided with a seat 26 for the body supporting semi-elliptic spring D, which extends longitudinally of the adjacent side rail C of the vehicle with its middle portion secured to said seat by means of the usual U-bolts 27. Extending from each end of the centrally disposed differential gear unit E of the axle to the spring supporting bracket F located on that side of said unit is a strut rod 28, whose inner end is pivotally connected by a horizontal bolt 29 to an outstanding lug 30 on the adjacent end of the housing 6 of said unit and whose outer end is pivotally connected by a horizontal bolt 31 to a lug 32 that depends from the cylindrical main body portion of said bracket.

In the modified driving axle construction shown in Fig. 3, the body supporting spring D' is arranged below the wheel center axle shaft, the strut rods 28a are located above the wheel center, and the outermost universal joint 5a of the articulated axle shaft is located outside of the wheel bearings 20a with the outer or driven member of said joint bolted to the wheel hub 16a. The spring D' has its middle portion suitably secured by U-bolts 27a to the underside of the bracket F', upon which the wheel B' is journaled; and said bracket is provided at its inner end with an upstanding portion 32a to which the outer end of the strut rod 28a is pivotally secured by horizontal bolts 31a. The inner end of each strut rod 28a is pivotally secured by means of a horizontal bolt 29a to a bracket 33 that is rigidly secured to the underside of the transverse frame member C' of the body supporting frame. The bracket 33 also serves as a support for the driving unit A', which is shown provided with an overhung worm, said unit being removably secured to said bracket by bolts 34 that extend through registering holes in cooperating lugs 35 and 36, respectively, on said bracket and said unit. This modified driving axle construction permits the use of a conventional chassis with the springs located directly beneath the frame or body, it also provides for greater compactness of design and it also permits the driving unit to be removed without disconnecting the strut rods.

In both forms of our invention springs D not only function to support the load and transmit the braking torque and propulsive or driving forces to frame C, but they also cooperate with struts 28 and 28a to stabilize the wheel suspension. In other words, springs D restrain the upper ends of wheel brackets F against lateral movement toward and away from frame C as wheels B undergo vertical movement, and struts 28 restrain the lower ends of the brackets from moving bodily toward and away from the frame. In the wheel suspension illustrated in Figures 1 and 2, struts 28 operate as tension members, while in the device shown in Figure 3, struts 28a operate as compression members.

The hereinbefore described invention has numerous advantages. It dispenses with the use of the load supporting axle heretofore used for transmitting the load from the vehicle frame to the wheels; it also permits the use of a separate longitudinally disposed semi-elliptic spring for connecting each wheel to the vehicle frame; and it also permits each road wheel to move independently of the other wheel in accommodating itself to the contour of the road. The brackets F provide simple and efficient spring supports and also serve as spindles on which the wheels rotate; and the strut rods 28 serve to stabilize the wheels by tying said brackets to the vehicle body or to the centrally disposed differential gear unit suspended therefrom.

Obviously, the hereinbefore described automotive vehicle constructions admit of considerable modification without departing from the invention. Therefore, we do not wish to be limited to the precise constructions shown and described.

What we claim is:

1. A motor vehicle comprising a driving gear unit, a flexible axle shaft driven by said driving unit, a wheel operatively connected to each end of said flexible axle shaft, a bracket having a hollow spindle surrounding a portion of said flexible axle shaft and upon which said wheel is journaled, a semi-elliptic spring supported by said bracket, a member supported by said spring, a bracket fixed to said member and supporting said driving gear unit, and a rod pivotally connected at one end to said first mentioned bracket and at the other end to said last mentioned bracket.

2. A motor vehicle comprising a frame, a differential gear unit removably secured to said frame, a flexible axle shaft driven by said differential gear unit, wheels operatively connected to the outer ends of said axle shaft, brackets having hollow spindle portions surrounding the outer end portions of said axle shaft, said wheels being journaled on said spindle portions, semi-elliptic side springs mounted on said brackets and connected to said frame, and strut rods pivotally connected to said frame and said brackets.

3. In an independent wheel suspension for a motor vehicle, in sub-combination, a chassis; a leaf spring disposed longitudinally of said chassis and having a wheel supporting portion, means for securing said spring to said chassis in such manner that the wheel supporting portion thereof is constrained to move substantially vertically with respect to said chassis; a wheel; a wheel supporting member rigidly secured to the wheel supporting portion of said spring and rotatably supporting said wheel; the point of securement of said wheel support to said spring being vertically offset from the axis of said wheel, and stabilizing means, substantially vertically spaced from said spring, for preventing said wheel and wheel supporting member from undergoing rocking movement about said spring as an axis in response to loads placed upon said chassis, said stabilizing means comprising a link member transversely disposed with reference to the chassis and which is pivotally supported upon said chassis by a fixed pivot and pivotally connected to said wheel supporting member a considerable distance vertically from said spring, said spring being operable to restrain said wheel supporting member from rocking about the axis of said wheel.

4. The wheel suspension described in claim 3, wherein said link functions as a compression element and is disposed above the axis of said wheel.

5. The wheel suspension described in claim 3, wherein said link functions as a tension element and is disposed above the axis of said wheel.

6. In an independent wheel suspension for a motor vehicle, in sub-combination, a chassis; a leaf spring mounted upon, and disposed longitudinally of said chassis and secured at each of its ends thereto so as to constrain the intermediate portion thereof to undergo substantially vertical deflections; a wheel; a wheel supporting member rigidly secured to the intermediate portion of said spring and rotatably supporting said wheel; the points of securement of said wheel support and said spring being vertically offset from the axis of said wheel, and stabilizing means, substantially vertically spaced from said spring, for preventing said wheel and wheel supporting member from undergoing rocking movement about said spring as an axis in response to loads placed upon said chassis, said stabilizing means comprising a link member transversely disposed with respect to the chassis and which is pivotally supported upon said chassis by a fixed pivot and pivotally connected to said wheel supporting member on the opposite side of said axis from said spring, said spring being operable to restrain said wheel supporting member from rocking about the axis of said wheel.

7. The wheel suspension described in claim 6, wherein said spring is disposed below the axis of said wheel and said link is disposed above the axis of said wheel.

8. The wheel suspension described in claim 6, wherein said spring is disposed above the axis of said wheel and said link is disposed below the axis of said wheel.

9. In an independent wheel suspension for a motor vehicle, in subcombination, a chassis; a spring mounted upon and disposed longitudinally of said chassis and having a load supporting portion which is constrained to move substantially vertically with respect to said chassis; a wheel; a wheel-supporting member rigidly secured to the load supporting portion of said spring and rotatably supporting said wheel; and stabilizing means, substantially vertically spaced from said spring, for preventing said wheel and wheel supporting member from undergoing rocking movement about said spring as an axis in response to loads placed upon said chassis, said stabilizing means comprising a link member which is pivotally supported upon said chassis and pivotally connected to said wheel supporting member, said spring being operable to restrain said wheel supporting member from rocking about the axis of said wheel, said spring being disposed below the axis of said wheel and said link being disposed transversely to the chassis and lying above the axis of said wheel.

10. In an independent wheel suspension for a motor vehicle, in sub-combination, a chassis; a pair of leaf springs disposed at one end of said chassis and each having a wheel supporting portion and disposed longitudinally of said chassis, and means for securing said springs to said chassis in such manner that the wheel supporting portion thereof is constrained to move substantially vertically with respect to said chassis; a pair of wheels; a wheel supporting member rigidly secured to the wheel supporting portion of each of said springs and rotatably supporting said wheels; the points of securement of said wheel supports to said springs being vertically offset from the axes of said wheels, and stabilizing means, substantially vertically spaced from said springs for preventing said wheels and wheel supporting members from undergoing rocking movement about said springs as axes in response to loads placed upon said chassis, said stabilizing means comprising a pair of link members transversely disposed with reference to the chassis and which are pivotally supported upon said chassis by fixed pivots and pivotally connected to said wheel supporting members a considerable distance vertically from said springs, said springs being operable to restrain said wheel supporting members from rocking about the axes of said wheels, and the fixed pivots for said links being so designed to render said links mechanically independent, whereby the latter may undergo individual rocking movement about their fixed pivots without influencing each other.

HERBERT W. ALDEN.
LAURENCE RAYMOND BUCKENDALE.